United States Patent
Chivi et al.

(10) Patent No.: US 6,185,626 B1
(45) Date of Patent: Feb. 6, 2001

(54) ARRANGEMENT AND METHOD FOR LINKING CLIENTS TO SERVERS AT RUN TIME IN A DISTRIBUTED NETWORKING ENVIRONMENT

(75) Inventors: Anwar Hanna Chivi, Kista; Richard Komi Adjimah, Solna, both of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 08/993,609

(22) Filed: Dec. 18, 1997

Related U.S. Application Data

(63) Continuation of application No. PCT/SE96/00802, filed on Jun. 19, 1996.

(30) Foreign Application Priority Data

Jun. 19, 1995 (SE) ................................................... 9502216

(51) Int. Cl.⁷ ...................................................... G06F 15/16
(52) U.S. Cl. ......................... 709/248; 709/226; 709/229; 713/201
(58) Field of Search ............................. 707/10, 100, 103, 707/200, 300; 709/226, 248, 229; 711/117; 713/201

(56) References Cited

U.S. PATENT DOCUMENTS

| | | | |
|---|---|---|---|
| 5,483,652 | * | 1/1996 | Sudama et al. ......................... 707/10 |
| 5,692,180 | * | 11/1997 | Lee ......................................... 707/10 |
| 5,724,512 | * | 3/1998 | Winterbottom ...................... 709/226 |

FOREIGN PATENT DOCUMENTS

| | | |
|---|---|---|
| WO95/17062 | 4/1994 | (WO) . |
| WO95/20300 | 1/1995 | (WO) . |

OTHER PUBLICATIONS

John Bloomer, Distributed Computing and the OSF/DCE, Dr Dobb's Journal reprint, Feb. 1995.*
Sato et al., "Network Directory Concept for an Intelligent Network", IEEE Conference, Nov. 1989.*
A.E. Hodson, "The Global Directory—An Overview", IEE Colloquium, Apr. 1990.*
S.E. Kille, "Implementing the Directory", IEE Colloquium, Apr. 1990.*

* cited by examiner

*Primary Examiner*—Le Hien Luu
*Assistant Examiner*—Farzaneh Farahi
(74) *Attorney, Agent, or Firm*—Burns, Doane, Swecker & Mathis, L.L.P.

(57) ABSTRACT

The invention relates to an arrangement and a method for linking clients to servers at run time in a distributed networking environment, particularly for start synchronization in a digital telecommunication system. The system comprises at least one ground based radio communication unit (12, 13) and a number of mobile radio communication units (11) for communication with or via said ground based radio communication unit (12, 13). Each of said communication units is provided with a digital data processor server (14, 15) linked to a communication port (16, 17). According to the invention, each communication port (16, 17) is linked to a functional unit (10) which acts as a distributed database which is able to register when a specified server (14, 15) becomes available in a defined domain.

23 Claims, 2 Drawing Sheets

ARRANGEMENT AND METHOD FOR LINKING CLIENTS TO SERVERS AT RUN TIME IN A DISTRIBUTED NETWORKING ENVIRONMENT

This application is a continuation of International Application No. PCT/SE96/00802, filed Jun. 19, 1996, which designates the United States.

The present invention relates to an arrangement and a method for linking clients to servers at run time in a distributed networking environment, particularly for start synchronization in a digital telecommunication system, comprising at least one ground based radio communication unit and a number of mobile radio communication units for communication with or via said ground based radio communication unit, wherein each of said communication units is provided with a digital data processor server linked to a communication port.

In distributed computing systems, applications are distributed throughout the network. These applications are made available at varying points of time. As a result of this, one application (addressing application) may try to address another application (addressed application) before the addressed application has become available. This means that it is very difficult to use time synchronization to resolve the numerous client server relationships between the distributed softwares. Furthermore, another important factor is that the lack of one single server software to start should not prevent the entire system from starting and working.

One possible solution is to let each application try addressing the other application until a response from the other application is received. The problem with this solution is the bad use of system capacity. The communication costs for unnecessary messages is high.

For example, a digital tele-communication system is realized as a network of neighbouring radio cells, together providing coverage of a service area. Such a system allows mobile stations to move freely between the cells in the service area without interruption of communication. A number of distributed databases are used to keep track of mobile stations. These databases may for example contain subscriber information, authentication parameters and ciphering keys. When a mobile station roams into a new mobile services switching centre area, the visitor location register database connected to that mobile services switching centre will request data about said mobile station from the home location register database.

Thus, in the field of mobile telecommunications, it would be especially advantageous to reduce unnecessary messages since this will unload processors and increase traffic capacity, for example during handover of calls in progress between cells or from one base station controller to another base station controller.

SUMMARY

An object of the invention is therefore to provide a flexible start synchronisation mechanism, making paired client-server communication handling independent of each other.

Therefore, an arrangement for handling linking of clients to servers at run time is provided. In the arrangement each communication port is linked to a functional unit which acts as a distributed database which is able to register when a specified server becomes available in a defined domain. This solution results in the use of a loose synchronisation mechanism based on events instead of time, between applications.

The functional unit can use an internal interface to distribute port names throughout a zone.

The functional unit can also use a first external interface to the internal process communication, to publish a port name, search and analyze for a port name, withdraw a port name, and to modify a port name.

The functional unit can also use a second external interface to users, who want to communicate at start phase, wherein users subscribe for a specified port name, making the functional unit wait for the requested port name to become available.

The functional unit can also use a third external interface to system upgrading, wherein system upgrading uses the interface to find which marks are related to a specific object type/object individual.

Preferably, the functional unit also uses a fourth external interface to processor error handle, wherein the functional unit acts as a server which will be informed when a processor failure occur.

In a preferred embodiment of the invention, a functional unit is allocated to each distributed communication operating system processor in a subnet.

It is an advantage with the invention that a functional unit at a zone level is able to communicate with a number of functional units at a subnet level, and that the functional units at said subnet level are each able to communicate with a number of functional units at a processor level.

The method according to the invention is characterized in that each client subscribes to a defined domain through a functional unit, and that each server is able to publish the service it provides through a defined domain, by registering it to said functional unit.

Preferably, the functional unit can be requested to register and notify a client processor when the specified server becomes available.

According to the invention, the functional unit can also be requested by a server to register that the service said server provides is available.

Preferably, each server publishes its service by means of a specified port name, which publication is bound to a working domain in which said service is accessible. This publication is distributed within the domain by means of the functional unit.

The port name can be a data structure which comprises parameters regarding object type, object individual and system upgrading.

The published data can be secured from unauthorized objects by means of a key which is returned to the applications, which key also can be used for modification or withdrawal of said publication.

The functional unit supports withdrawal of a port name, which action takes place when an object ceases to be used by any application or when a fault is detected.

The process of withdrawal of a port name involves a comparison between the stored key and a received key, to make sure that the withdrawal is being made by the correct port.

The functional unit also supports search and analysis of a port name, which action takes place when an object sends a message to another object using a port name as an address.

The process of search and analysis of a port name is handled by inter process communication, which calls the functional unit to get the destination address and in case the port name is not found, the message is returned to the sender with an error indication.

The functional unit supports modifying of a port name, which action takes place at system upgrading phase and has the same syntax as publish.

Preferably, modifying of a port name involves changing the system upgrading mark, to enable publishing a new object having the same object type and object individual, allowing testing of the new object during traffic, and removal of the old object from the network when the test has been passed.

The functional unit also can support wait for publishing of a port name, which action takes place at start and system upgrading phase.

Waiting for publishing of a port name preferably involve making the functional unit wait for the demand port name to be published, specifying a maximum waiting time, and informing objects when a specified object has published its port name to the functional unit.

BRIEF DESCRIPTION OF THE DRAWINGS

The invention will be further described in the following in a non-limiting way with reference to the accompanying drawings, in which FIG. 1 schematically illustrates an arrangement of functional units in a telecommunication network zone, in accordance with the invention, FIG. 2 schematically illustrates a port name addressed message route to destination.

DETAILED DESCRIPTION

Figure 1:
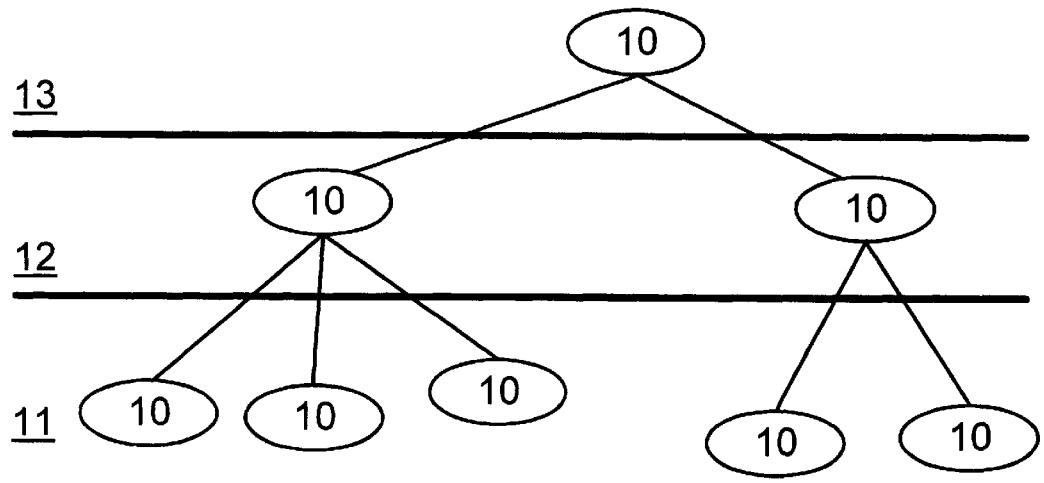

The schematically illustrated arrangement in FIG. 1 shows a number of functional units 10 in a telecommunication network zone, which units are each associated with a distributed communication operating processor. The functional unit acts as an intermediary name addressing service agent at each node in the network, thus, dividing the network into several domains: local processor level 11, subnet processor level 12 and zone processor level 13.

Each processor server is able to publish its service via the functional unit 10 by giving it a specific name, a so called Port Name. This publication is bound to the working domain in which the service will accessible. The functional units 10 will distribute this publication within the domain, i.e. the functional units will spread the information hierarchically to other functional units within the domain.

The name addressing service unit 10 acts as a distributed data base, in which it has the traditional functions to store, retrieve and delete the information (service name and its address) within the domain. Depending upon in which domain the name addressing service unit is located, the unit can store the address in different repositories. This means that the client is able to direct its demands (retrieval, subscription) in a specific domain.

Thus, the functional unit can provide its services in an incremental way, and the start synchronization is very loose, which enhances flexibility.

The Port Name is unique and unchangeable wherever it is allocated in the network. This will contribute to characteristics like distribution transparency, change-over transparency and fault tolerance. The Port Name is a data structure which consists of three parameters: Object Type, Object Individual and System Upgrading Mark.

The functional unit 10 supports the following functions:
Publishing of a Port Name
Withdrawal of a Port Name
Search and analysis of a Port Name
Modifying of a Port Name
Wait for publishing of a Port Name Publishing of a Port Name is an activity which takes place at starting phase, or at system upgrading and is directed towards any functional unit 10. The applications (objects) will announce their existence in the network (zone). The functional unit is responsible for spreading the publication within the scope, defined at publishing, together with the port name and a port reference. The scope can be a processor, a subnet or a zone, and states the domain within which the objects are visible and thereby available. To secure the published data from unauthorized objects, a unique key is returned to the applications, which key is used when the application wants to modify or withdraw its own publication.

Withdrawal of a Port Name is an activity which takes place when an object ceases to be used by any application or when a fault is detected. As is done at publishing, the withdrawal is directed towards a functional unit 10 which takes responsibility for spreading it within the scope. To secure this operation, a comparison is made between the stored key and the received one, this to make sure that the withdrawal is being made by the correct port.

Figure 2:
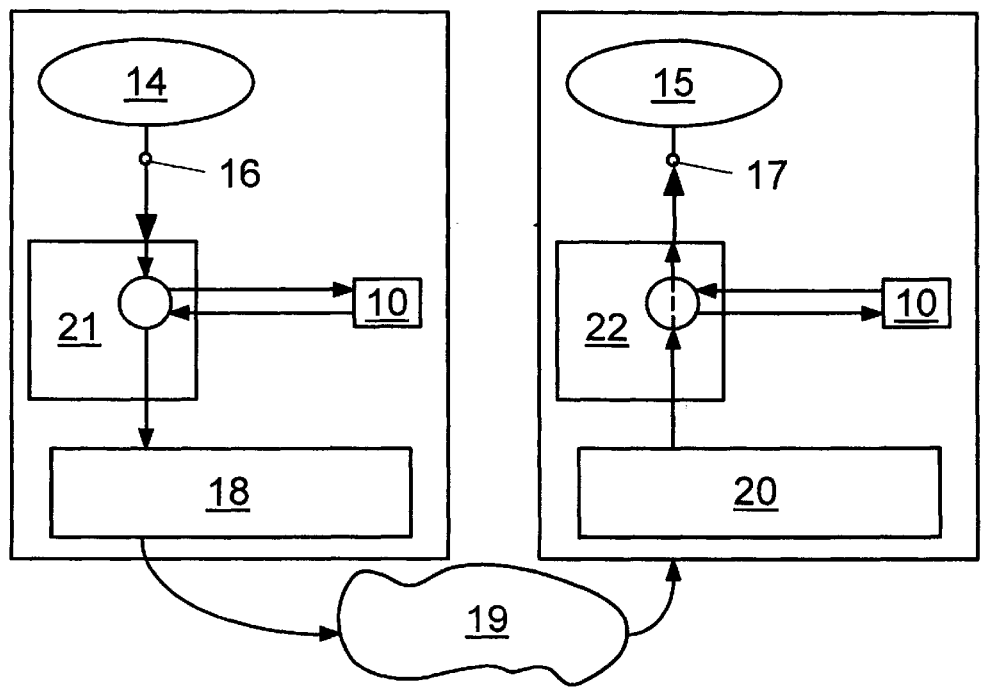

Search and analysis of a Port Name is an activity which takes place when an object 14 (client located at processor A) sends a message to another object 15 (server located at processor B) via the ports 16, 17 and a message passing service network 18, 19 and 20, using a Port Name as an address (see FIG. 2).

The message is handled by the sender's inter process communication 21 which calls the functional unit 10 to get the destination address. The message is passed via the message passing service network 18, 19 and 20 to the destination object's inter process communication 22, which passes the message on to the destination object 15 when a port reference is known. If the port name is not found, the message is returned to the sender 14 with an error indication.

Modifying of a Port Name is an activity which takes place at System upgrading phase. The application that published its Port Name will change the system upgrading mark. This enables publishing a new object having the same Object Type and Object Individual but with different system upgrading mark. The result is that it is possible to test the new object during traffic. If the new object pass the test, the old one will be removed from the network. Modifying has the same syntax as publish, but only system upgrading mark can be modified, it is not possible to modify the other parameters.

Waiting for publishing of a specific Port Name is an activity which takes place at start and System upgrading phase. Objects start at different times. As a result of this, an object may try to address, by port name, objects that are not yet published. In this case a subscription of a specified port name is made, making the functional unit 10 wait for the demand port name to be available (published). The objects are then being informed when a specified object has published its port name to the functional unit. In order to prevent the functional unit from waiting "an indefinite time", the user must state a maximum waiting time.

The functional unit 10 supports two types of subscription:
Synchronous subscription, wherein the client will be suspended until a port name is published or the specified time has expired.
Asynchronous subscription, wherein the client will continue execution and will receive information as soon as the specified port name has been published or the specified time has expired.

Figure 3:
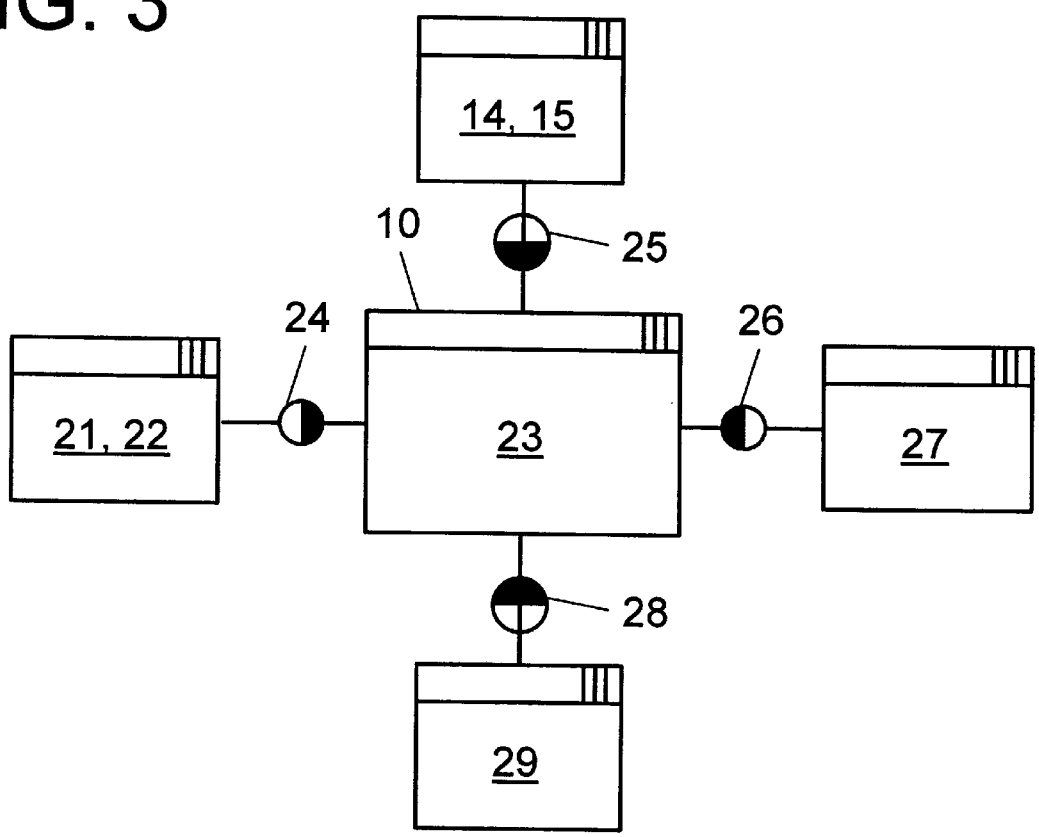
FIG. 3 illustrates functional unit interfaces.

The functional unit uses the following interfaces (see FIG. 3):

An internal interface 23 is used for distributing Port Names throughout the zone.

A first external interface 24 to the inter process communication 21, 22, which is a pure Client and Server interface, where the functional unit is the server. The inter process communication 21, 22 uses the interface to publish a Port Name, to search and analyze for a Port Name. to withdraw a Port Name, and to modify a Port Name.

A second external interface 25 to users 14, 15, which interface 25 is used by all users who want to communicate at start phase. Users will subscribe for a specified Port Name, making the functional unit wait for the requested Port Name to be available (published).

A third external interface 26 to system upgrading 27, which is a pure client and server interface, where the functional unit is the server. System upgrading uses the interface to find which marks are related to a specific Object Type/Object Individual.

A fourth external interface 28 to processor error handle 29, which interface is a pure client and server interface, where the functional unit is the server. Processor error handle will inform the functional unit when a processor failure occur.

In general, the functional unit tries to avoid that a fault of any kind will paralyse all unit functionality. Instead the functional unit will alarm and operation and maintenance will take the appropriate actions.

In case of processor failure, the functional unit will receive information either from the message passing service or operation and maintenance. The functional unit can not make a recovery. Instead operation and maintenance will attempt to start the processor and all objects will be republished.

The functional unit supports:

Distribution transparency, which means that clients do not need to know where the servers are allocated. The functional unit conceals server redundancy by having a stable Port Name.

System concept N+1 redundancy: In case of processor failure within a subnet, other processors will take over servers that was handled by the failing processor. This will only occur within a subnet.

Start synchronization.

System upgrading.

Figure 4:
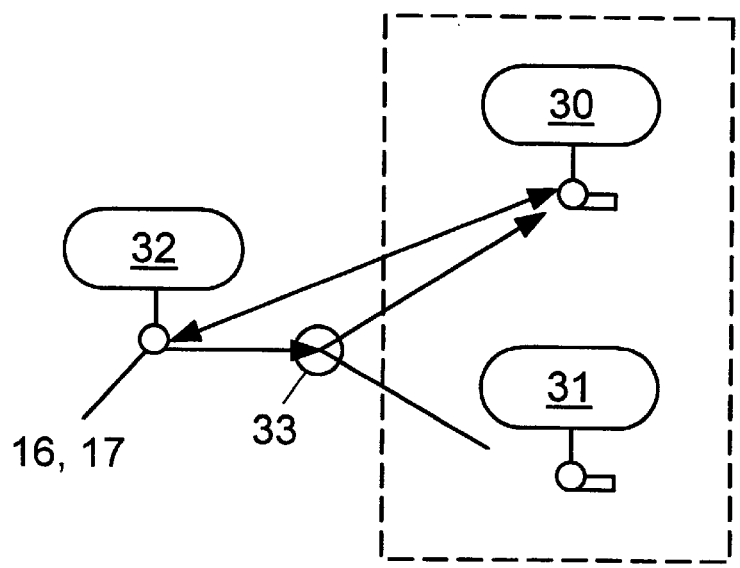
FIG. 4 illustrates load sharing within the network.

In a function addressing mode, the applications need to find a server in order to execute a specific function. The server does not need to be related to a specific data partition (individual). This means that any server 30, 31 of a specific type can be chosen (load sharing) by a client 32 via a routing point 33 (see FIG. 4). This implies that servers in several processors create ports with identical port names. These servers publish their Port Names to at least subnet level, so that they are visible for the functional unit at subnet level (load sharing exists only within a subnet).

In a partitioned function addressing mode, clients need to address a server that is related to a specific data partition. This server directly or indirectly handles several real objects. Partition data relating to a real object decides in which server the process will end up.

In an object addressing mode, the applications need to find a specific server, which handles one and only one real object.

In order to have a fault tolerant functional unit according to the invention, functionality at subnet level is duplicated (see FIG. 1). This means that the functionality must not disappear in case of a single processor failure. The following structure has been designed to obtain fault tolerance:

Distribution of subnet functionality to all processors in the subnet.

Distribution of zone functionality to all subnets in the zone.

Storage capacity of the service will be affected by the number of Port Names and implementation of the Port Name table.

The functional unit according to the invention relies on the following system functionality:

Processor supervision in the subnet. This is used to decide if the processor is available or not.

Configuration data at the starting phase.

The invention is not limited to the above described embodiment, but several modifications can be made within the scope of the accompanying claims.

What is claimed is:

1. An arrangement for linking clients to servers at run time in a distributed networking environment, particularly for start synchronization in a digital telecommunication system, comprising at least one ground based radio communication unit and a number of mobile radio communication units for communication with or via said ground based radio communication unit, wherein each of said communication units is provided with a digital data processor server linked to a communication port, wherein each communication port is linked to a functional unit which acts as a distributed database which is able to register when a specified server becomes available in a defined domain, each port being provided by a name, which is a data structure comprising parameters regarding object type, object individual and system upgrading, and wherein each server publishes its service by means of a specified port name, and further wherein the published data is secured from unauthorized objects by means of a key which is returned to the applications, which key is also used for modification or withdrawal of said publication.

2. An arrangement according to claim 1, wherein the functional unit uses an internal interface to distribute port names throughout a zone.

3. An arrangement according to claim 2, wherein the functional unit uses a first external interface to the internal process communication to publish a port name, search and analyze for a port name, withdraw a port name, and to modify a port name.

4. An arrangement according to claim 3, wherein the functional unit uses a second external interface to users who want to communicate at start phase, wherein users subscribe for a specified port name, making the functional unit wait for the requested port name to become available.

5. An arrangement according to claim 4, wherein the functional unit uses a third external interface to system upgrading wherein system upgrading uses the interface to find which marks are related to a specific object type/object individual.

6. An arrangement according to claim 5, wherein the functional unit uses a fourth external interface to processor error handle, wherein the functional unit acts as a server which will be informed when a processor failure occur.

7. An arrangement according to claim 1, wherein a functional unit is allocated to each distributed communication operating system processor in a subnet.

8. An arrangement according to claim 7, wherein a functional unit at a zone level is able to communicate with a number of functional units at a subnet level, and that the functional units at said subnet level are each able to communicate with a number of functional units at a processor level.

9. A method for linking clients to servers at run time in a distributed networking environment, particularly for start synchronization in a digital telecommunication system, comprising at least one ground based radio communication unit and a number of mobile radio communication units for communication with or via said ground based radio communication unit, wherein each client subscribes to a defined domain through a functional unit, and that each server is able to publish the service it provides through a defined domain, by registering it to said functional unit, each port being provided by a name, which is a data structure comprising parameters regarding object type, object individual and system upgrading and each server publishes its services by means of a specified port name, and wherein the published data is secured from unauthorized objects by means of a key which is returned to the applications, which key is also used for modification or withdrawal of said publication.

10. A method according to claim 9, wherein the functional unit is able to be requested to register and notify a client processor when the specified server becomes available.

11. A method according to claim 9, wherein the functional unit can be requested by a server to register that the service said server provides is available.

12. A method according to claim 9, wherein said publication is bound to a working domain in which said service is accessible.

13. A method according to claim 12, wherein the functional unit distributes the publication within the domain.

14. A method according to claim 9, wherein the functional unit supports withdrawal of a port name, which action takes place when an object ceases to be used by any application or when a fault is detected.

15. A method according to claim 14, wherein the process of withdrawal of a port name involves a comparison between the stored key and a received key, to ensure that the withdrawal is being made by the correct port.

16. A method according to claim 14, wherein the functional unit supports withdrawal of a port name, which action takes place when an object ceases to be used by any application or when a fault is detected.

17. A method according to claim 16, wherein the process of withdrawal of a port name involves a comparison between the stored key and a received key, to make sure that the withdrawal is being made by the correct port.

18. A method according to claim 14, wherein the functional unit supports search and analysis of a port name, which action takes place when an object sends a message to another object using a port name as an address.

19. A method according to claim 18, wherein the process of search and analysis of a port name is handled by inter process communication, which calls the functional unit to get the destination address and in case the port name is not found, the message is returned to the sender with an error indication.

20. A method according to claim 14, wherein the functional unit supports modifying of a port name, which action takes place at system upgrading phase and has the same syntax as publish.

21. A method according to claim 20, wherein modifying of a port name involves changing the system upgrading mark, to enable publishing a new object having the same object type and object individual, allowing testing of the new object during traffic, and removal of the old object from the network when the test has been passed.

22. A method according to claim 14, wherein the functional unit supports wait for publishing of a port name, which action takes place at start and system upgrading phase.

23. A method according to claim 22, wherein waiting for publishing of a port name involves making the functional unit wait for the demand port name to be published, specifying a maximum waiting time, and informing objects when a specified object has published its port name to the functional unit.

* * * * *